United States Patent [19]
Zeaman et al.

[11] Patent Number: 4,680,454
[45] Date of Patent: Jul. 14, 1987

[54] ODOMETER FOR GOLF CART

[76] Inventors: Robert E. Zeaman, 1727 W. Pershing, Phoenix, Ariz. 85029; David E. Meyer, 7140 W. Mescal St., Peoria, Ariz. 85345

[21] Appl. No.: 914,944

[22] Filed: Oct. 3, 1986

[51] Int. Cl.⁴ .................... G01C 22/00; G06M 1/10
[52] U.S. Cl. .................... 235/95 R; 235/95 B; 235/95 C; 235/96; 235/144 ME; 377/38; 377/88; 377/89
[58] Field of Search ............ 235/1 R, 1 B, 1 D, 95 R, 235/95 B, 95 C, 96, 144 ME; 377/38, 46, 89, 90, 88; 33/141 R, 141 C, 141 E, 142

[56] References Cited

U.S. PATENT DOCUMENTS

| | | | |
|---|---|---|---|
| 3,196,545 | 7/1965 | Zell et al. | 33/141 R |
| 3,779,456 | 12/1973 | Burnett | 235/95 C X |
| 4,308,665 | 1/1982 | Losch | 33/141 E |
| 4,430,561 | 2/1984 | Powell | 235/96 X |

Primary Examiner—Benjamin R. Fuller
Attorney, Agent, or Firm—Warren F. B. Lindsley

[57] ABSTRACT

An odometer for use by a golfer in the measurement of distance covered by each shot. The odometer attaches to the wheel of the cart and counts revolutions or parts of a revolution of the wheel through the use of a magnetic head that rotates past a Hall effect sensor. A digital readout indicator displays yards covered.

10 Claims, 13 Drawing Figures

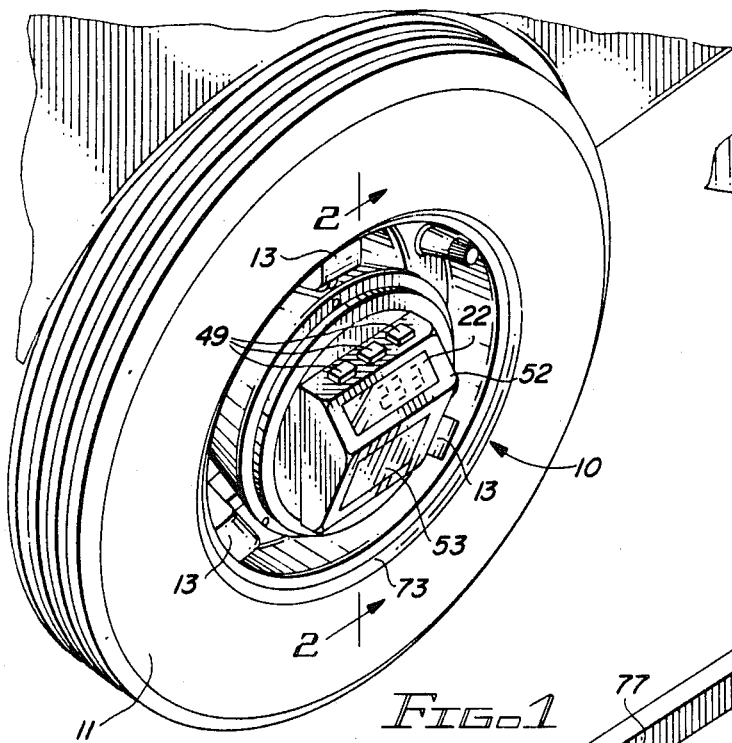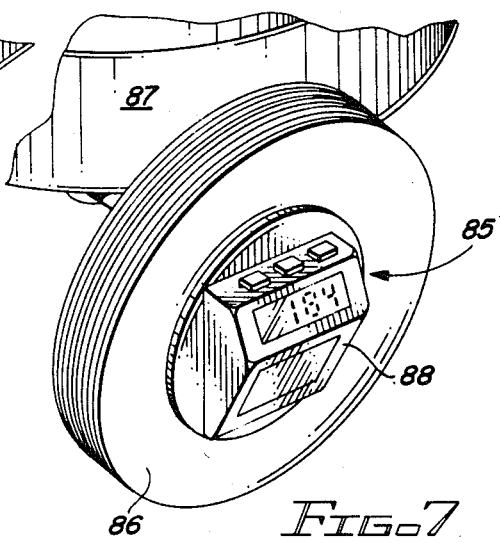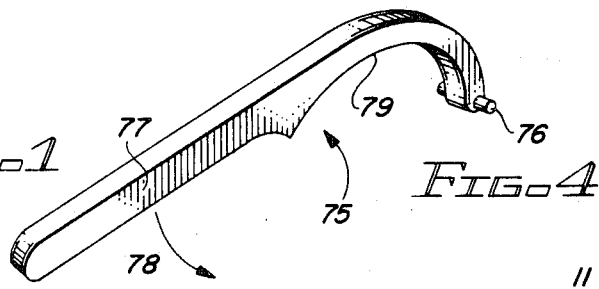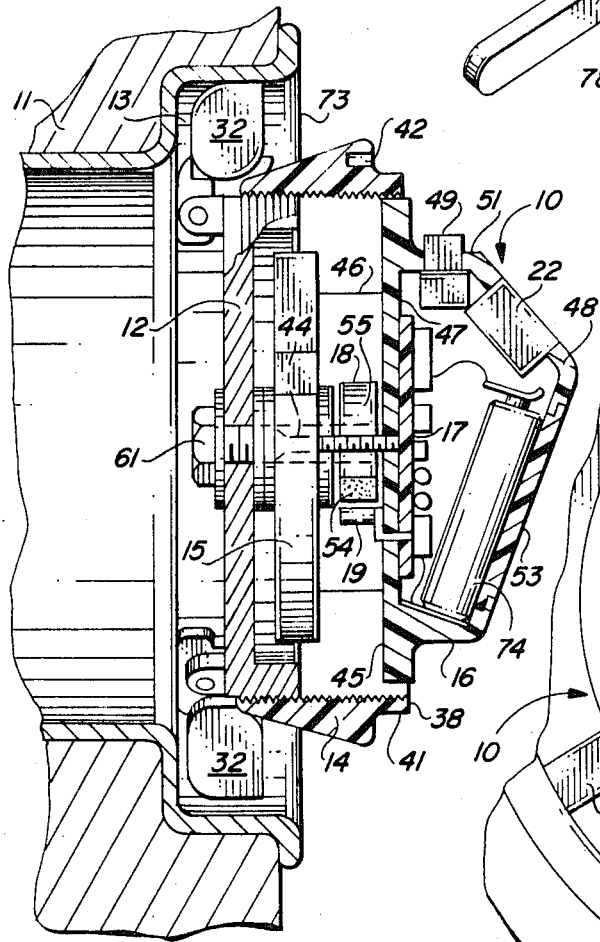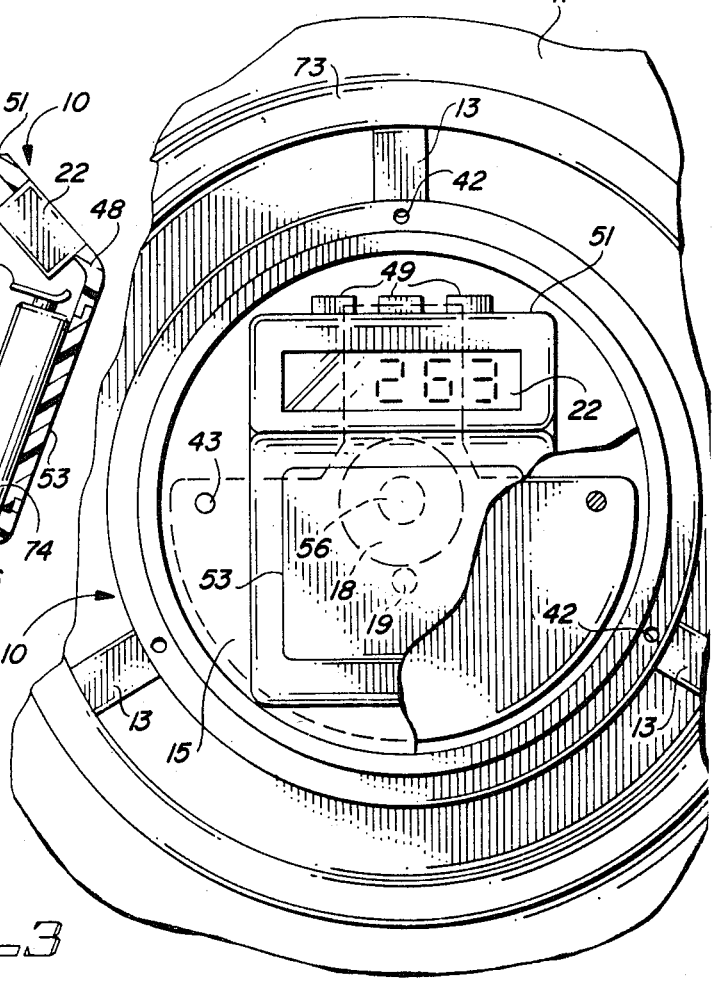

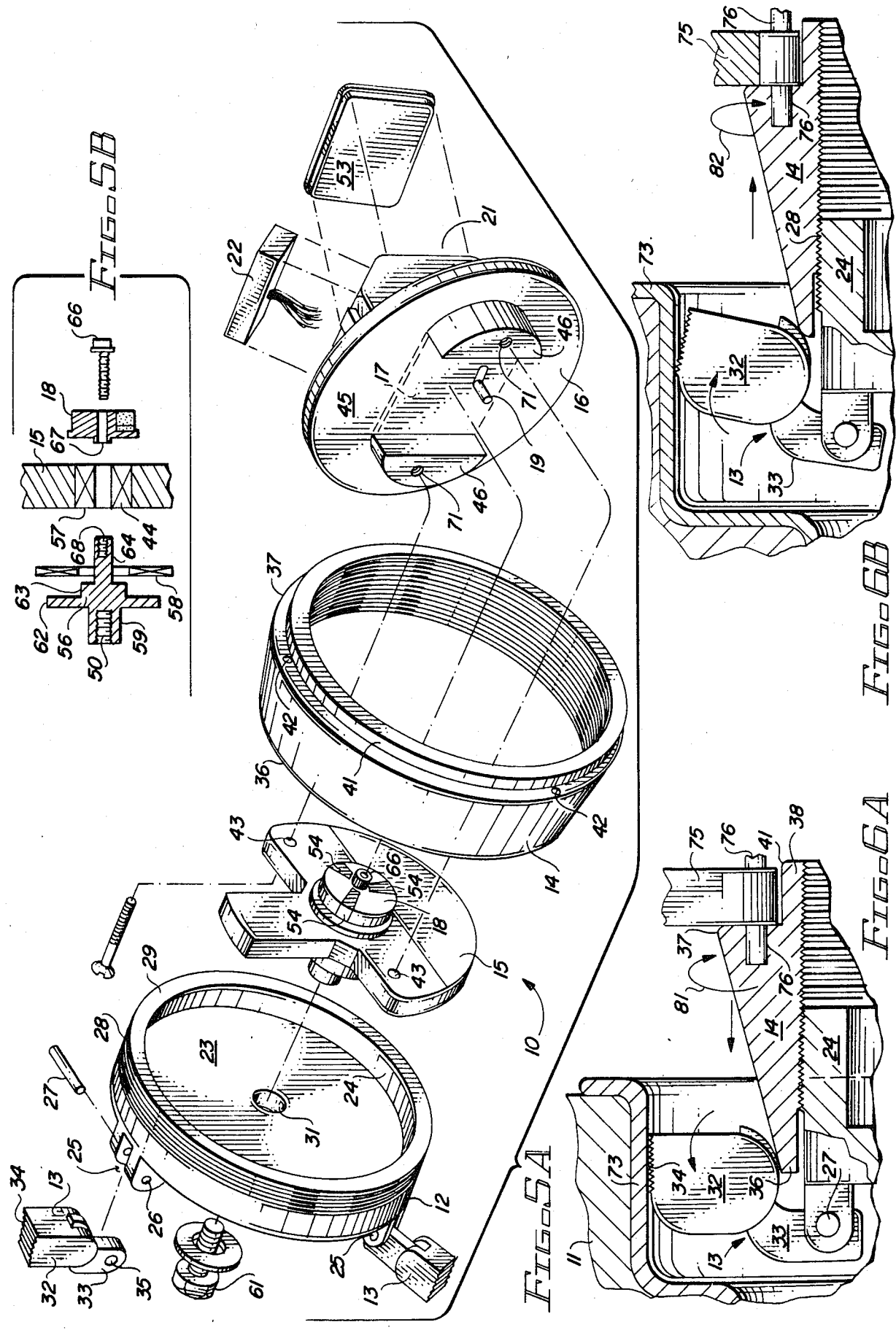

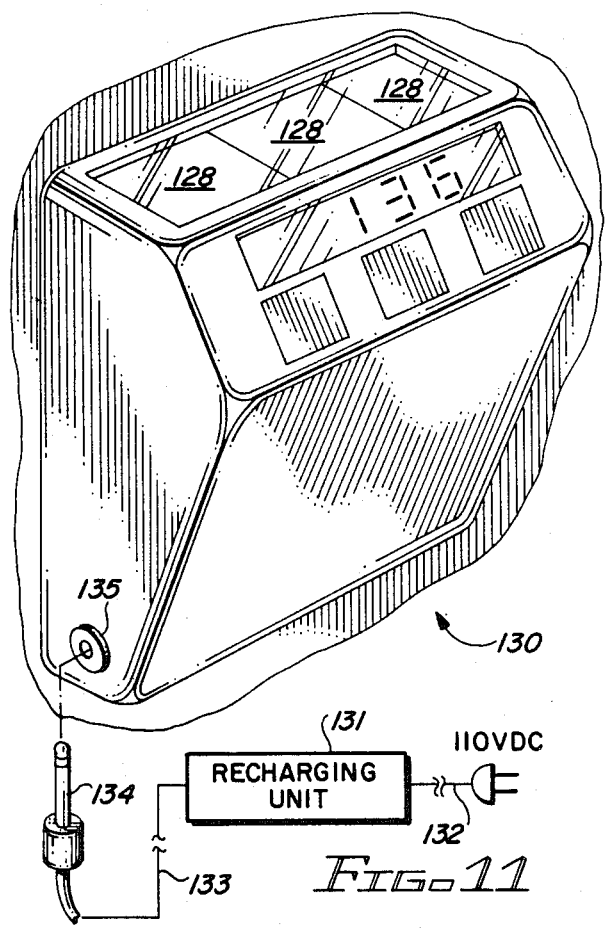
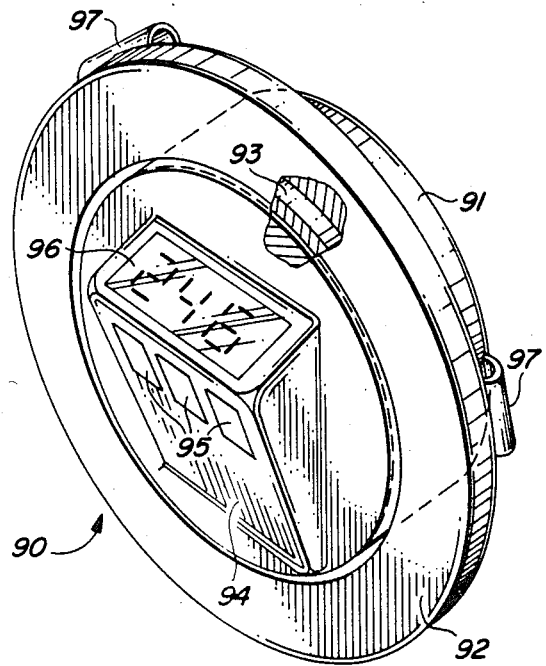
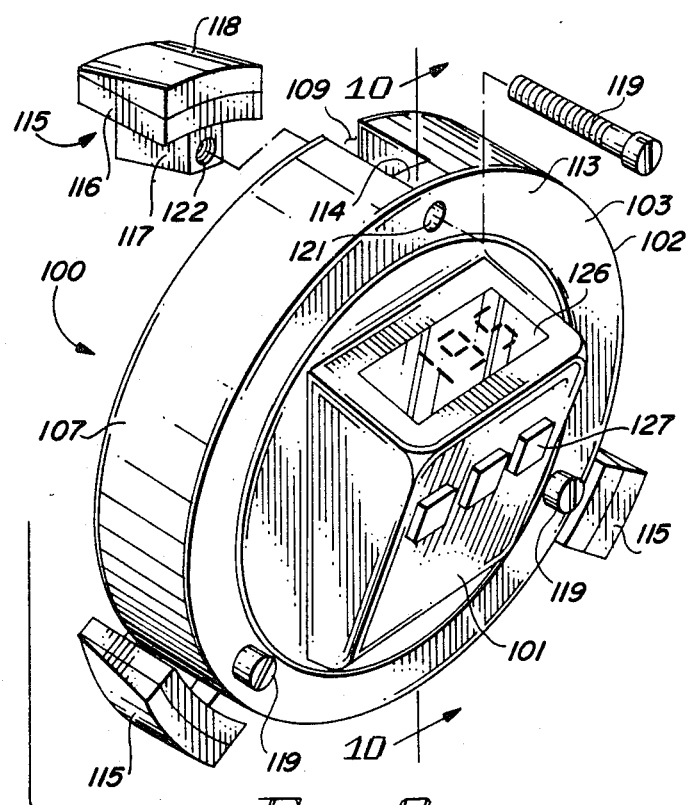
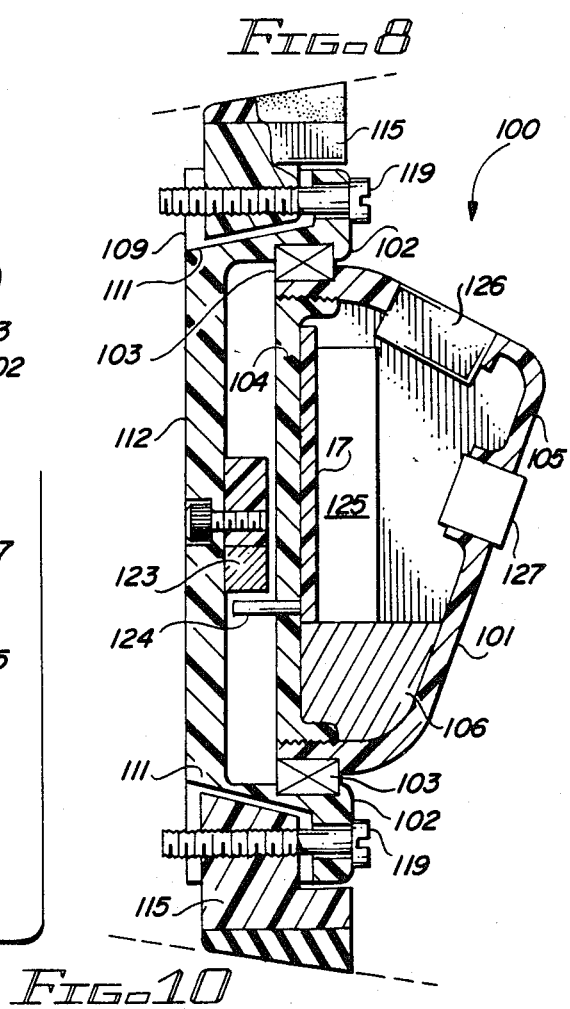
FIG.-11
FIG.-8
FIG.-9
FIG.-10

ODOMETER FOR GOLF CART

BACKGROUND OF THE INVENTION

In the game of golf, a player has a number of clubs, each of which is designed for use in a particular type of playing situation. Some clubs are designed for lift as needed for chip shots, some for long distances, others for shorter range. An experienced player develops a feeling for distance, and is able to select the appropriate club for any given shot. A less experienced player has difficulty in judging the required distance and is also less able to estimate how far the ball might be driven with a given club.

For these reasons, especially in the case of the relatively inexperienced golfer, a means is needed for measuring the distance covered by each shot. Because the total distance for each hole is known to the player, the distance remaining after each shot can be approximated by subtracting the distance already covered. Having a means to measure the distance covered with a given club, the player soon learns that one club may be good for a hundred yards, another for a hundred and fifty, etc. The learning process is thus enhanced, and the player is soon able to select the appropriate club with little difficulty.

Most golfers use either a riding golf cart, or one that is pulled along on wheels. Usually, neither type of cart is equipped with an odometer. The riding carts are usually rented at the golf course, while the smaller pull-along carts are typically owned by the individual player. In either case, an odometer of a type that is easily attachable to and readily removable from the cart will be desirable.

DESCRIPTION OF THE PRIOR ART

At the present time, no pertinent prior art is known.

SUMMARY OF THE INVENTION

In accordance with the invention claimed, a cart mounted odometer is provided for use by a golfer in the measurement of distance covered by each shot. The odometer disclosed incorporates a convenient means for mounting the device on a wheel of a golf cart.

It is, therefore, an object of the present invention to provide a cart mounted odometer for use by a golfer in the measurement of the distance covered by each shot during the course of a game.

Another object of this invention is to provide such an odometer in a form that incorporates a means for rapidly and easily attaching the odometer to a wheel of a golf cart.

A further object of this invention is to provide such an odometer in which the attachment means also facilitates the rapid removal of the device from the wheel of the cart upon the completion of the game.

A still further object of this invention is to provide such an odometer in a form that avoids the use of gears and other expensive machined parts.

A still further object of this invention is to provide such an odometer in a simple and inexpensive form that utilizes a minimum number of moving parts.

A still further object of this invention is to provide such an odometer in a form that registers distance for the convenience of the user.

A still further object of this invention is to provide such an odometer with variations of the attachment means to accommodate different sizes and configurations of the cart wheels to which the odometer is to be attached.

Further objects and advantages of this invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described with reference to the accompanying drawings, in which:

FIG. 1 is a perspective view showing the odometer of the invention attached to a wheel of a riding golf cart;

FIG. 2 is a cross-sectional view of the odometer of FIG. 1 as seen along line 2—2 of FIG. 1;

FIG. 3 plan view of the odometer of FIGS. 1 and 2, shown partially cut away to reveal details of the inner construction of the device;

FIG. 4 is a perspective view of a wrench, commonly known as a spanner, employed for locking the odometer to the cart wheel shown in FIGS. 1-3;

FIG. 5A is an exploded perspective view of the odometer of FIGS. 1-3.

FIG. 5B is an exploded view showing the rotational mounting of the various parts of the odometer shown in FIGS. 1-3;

FIGS. 6A and 6B are cross-sectional views illustrating the attachment mechanism employed in the odometer of FIGS. 1-3 and 5;

FIG. 7 is a perspective view of the odometer of the invention attached to the wheel of a pull-type golf cart;

FIG. 8 is a perspective view of a compact version of the odometer of the invention showing a hub cap mounting means;

FIG. 9 is a perspective view of the hub cap version of an odometer showing an alternate construction;

FIG. 10 is a cross-sectional view of FIG. 9 as seen along the line 10—10 of FIG. 9; and FIG. 11 is a functional diagram showing elements of an electrical system employed to power the odometer of the invention.

DESCRIPTION OF THE PREFERRED EMBODIMENT

Referring more particularly to the drawings by characters of reference, FIGS. 1-6 disclose a golf cart odometer 10 embodying the invention with FIGS. 1-3 showing the odometer attached to a wheel 11 of a golf cart. Odometer 10 comprises a frame or base 12, three wedging grips 13, a clamping ring 14, a supporting pendulum 15, an odometer housing 16, circuit board 17, magnetic head 18, Hall effect sensor 19, battery compartment 21 and digital readout indicator 22.

Base 12 has the form of a shallow cup with a flat circular floor 23 and a low cylindrical wall 24 extending laterally therefrom about its periphery. Extending perpendicularly from the outer edge of floor 23 are three pairs of pierced tabs 25 equally spaced apart at 120 degree intervals, each pair of tabs comprising a clevis-type mounting member for one of the wedging grips 13. As shown most clearly in FIG. 5A, the two flanges of each pair of tabs 25 are mutually parallel and spaced a short distance apart with their holes 26 aligned to receive a pin 27. At least a part of the outside surface of wall 24 is threaded with the threaded portion 28 extending from rim 29 toward base or floor 23. Floor 23 has a circular opening 31 extending axially through its center.

Each of the wedging grips 13 comprises a foot 32 rigidly secured thereto at the end of a support arm 33. The foot 32 has a cross section that is generally oval shape, except that one end 34 is flattened and grooved to form a gripping surface. Support arm 33, shaped like a dog leg, as shown in FIG. 6B, is attached to the center of foot 32 at its end opposite grooved end 34. The end of support 33 opposite its attachment to foot 32 is pierced by a hole 35 which is employed for receiving therethrough pin 27, when inserted between tabs 25 in mounting grip 13 to base 12.

Clamping ring 14 has the general form of a short cylindrical shell with its inside surface being threaded to mate with threaded portion 28 of base 12. Its cross section, as shown in FIG. 6A, is wedge shaped, having a thin forward edge or nose 36 and rising linearly to a maximum diameter at a point 37 near the rearward end 38 of ring 14. At point 37, the outer surface of ring 14 drops abruptly to a cylindrical surface 41 having a reduced diameter which surface is spaced at 120 degree intervals about the clamping ring 14, as shown in FIG. 3. Between point 37 and surface 41, three holes 42 are provided for engagement by a spanner wrench during the attachment of odometer 10 to wheel 11.

Supporting pendulum 15 is cut from a thick metal plate or cast in the form shown in FIG. 5A where it is seen to be generally circular with portions of the upper left and upper right-hand quadrants removed so that its center of gravity is located well below the center of a circle. Two holes 43 are provided, one to the left, and one to the right of the center of the circle. A circular opening 44 is provided at the center to receive a bearing. The outer diameter of pendulum 15 is sufficiently smaller than the inside diameter of wall 24 of base 12 to permit its free rotation therein.

Odometer housing 16 has a flat circular rear wall 45 from which protrude rearwardly two raised areas 46, the raised areas 46 being intended to serve as mounting feet for the attachment of housing 16 to pendulum 15. The inside face 47 of wall 45 serves as a mounting surface for circuit board 17. The outer shell 48 of housing 16 incorporates push-button controls 49, including a power ON/OFF button, a reset button, a digital readout indicator 22, and the battery compartment 21. For convenience, controls 49 are positioned on a horizontal upper surface 51 of shell 48. The readout indicator 22 is positioned in an inclined area 52 that is readily observed by the golfer from a standing position. The battery compartment 21 with its cover 53 is located out of the way in the lower portion of housing 16. Magnetic head 18 comprises three permanent magnets 54 spaced 120 degrees apart about the periphery of a thick disc-shaped holder 55.

As shown in FIGS. 5A and 5B, pendulum 15 and magnetic head 18 are mounted to base 12 by means of a shaft 56, a main bearing 57 and a thrust bearing 58.

Shaft 56 comprises four cylindrical sections of different diameters. Beginning at the left end of FIG. 5B, shaft 56 comprises a first cylindrical section 59 having a diameter just small enough to pass with clearance through opening 31 of base 12, and a threaded longitudinal bore 50 which mates with a threaded shaft of a machine screw 61 shown in FIG. 5A. Shaft 56 further comprises a second short section 62 having an enlarged diameter, and a third section 63 having a diameter slightly smaller than the inside diameter of thrust bearing 58 and a length approximating the thickness of bearing 58. A fourth section 64 of shaft 56 has a diameter approximately equal to the inside diameter of main bearing 57.

In the assembly of odometer 10, section 59 of shaft 56 is passed through opening 31 and screw 61 with its washer 65 is threaded into bore 50. As screw 61 is tightened, the left-hand face of section 62 is brought to bear against floor 23 of base 12 so that shaft 56 is mounted securely and nonrotationally to base 12. Thrust bearing 58 is now installed over section 63 of shaft 56. Main bearing 57, which has been installed in opening 44 of pendulum 15 in which it is held securely by an interference fit, is then installed over section 64 of shaft 56 where it is also held by an interference fit.

With pendulum 15 and bearing 57 mounted to shaft 56 as just described, the right-hand end of section 64 of shaft 56 protrudes slightly from the right-hand end of bearing 57 and beyond the right-hand surface of pendulum 15, so that magnetic head 18 may be mounted against the right-hand end of section 64 by means of a screw 66 that passes through an axial opening 67 of head 18 and is threaded into an axial bore 68 in the end of shaft 56.

It will now be noted that shaft 56 and head 18 are secured nonrotationally to base 12 while pendulum 15, by virtue of its mounting arrangement with bearings 57 and 58, is free to rotate upon shaft 56 relative to base 12 and head 18.

Housing 16 is secured to pendulum 15 by means of two screws that pass through threaded holes 71 in mounting feet 46 of housing 16 and through aligned holes 43 in pendulum 15. The mounting feet 46 have sufficient height above surface 45 to provide clearance between magnetic head 18, its mounting screw 66 and surface 45.

In a final step of the assembly, the three wedging grips 13 are pivotally mounted to the three pairs of tabs 25 by positioning the pierced ends of support arms 33 between paired tabs 25 and inserting pins 27 through aligned holes 26 and 35 of tabs 25 and support arms 33, respectively.

The assembled odometer 10 is mounted on wheel 11 of a golf cart by first positioning base 12 inside the rim 73 of wheel 11. As base 12 is moved inside rim 73, wedge grips 13, resisting entry, fall back against wall 24 of base 12. Clamping ring 14 is now threaded over threaded portion 28 of wall 24. As ring 14 is turned on, its nose 36 is driven forward in a wedging action between wall 24 and the base of foot 32 of grip 13. The wedging action drives foot 32 outwardly, pivoting grip 13 about pin 27 and clamping grooved end 34 against rim 73. Thus, clamped securely against rim 73, the three grips 13 securely hold odometer 10 in position inside wheel 11.

To securely tighten ring 14, a spanner wrench 75, as shown in FIG. 4, may be employed. In using wrench 75 for this purpose, pin 76 that extends from the tip of wrench 75 is inserted in one of holes 42 of ring 14, as shown in FIGS. 6A and 6B. Handle 77 is then urged downward in the direction of arrow 78, driving curved portion 79 against surface 41 of ring 14, thus applying a rotational moment to ring 14. Arrow 81 in FIG. 6A shows the direction of rotation thus applied for tightening grips 13, and arrow 82 in FIG. 6B indicates the direction of rotation for loosening the grips.

In operation, as wheel 11 rotates, moving the golf cart forward, magnetic head 18 rotates with wheel 11 while pendulum 15, by virtue of its rotational mounting on bearings 57 and 58 and its asymmetrical weight distribution thereabout carries housing 16 nonrotationally relative to the ground surface in a fixed upright position. Sensor 19, extending perpendicularly from the under side of circuit board 17 extends in close proximity past the periphery of magnetic head 18. Each time one of the magnets 54 passes by sensor 19, an electric signal is generated by sensor 19. The signals thus generated, trigger a counter on circuit board 17 as well known in the art. Additional circuits on board 17 convert the accumulated signal count to distance covered by the golf cart, and the distance covered is displayed on indicator 22. After each such distance measurement, the counters and associated registers on circuit board 17 are reset to zero by means of one of the push-button controls 49.

Electrical power for circuit board 22 is supplied by storage batteries 74 mounted inside battery compartment 21 behind removable cover 53.

Because the only moving parts involved comprise the rotation of odometer 10 relative to base 12 within bearings 57 and 58, mechanical failure is reduced to a minimum. The electronic circuits are readily implemented, using a few standard and inexpensive integrated circuits available in the trade. Thus, the result is an inexpensive and highly reliable odometer.

While odometer 10 is intended primarily for use on riding-type golf carts, variations in its construction, primarily in connection with its mounting means will readily adapt the odometer for use on smaller pull-type golf carts.

FIG. 7 shows one such a variation of the invention in the form of an odometer 85 mounted on a wheel 86 of a pull-type golf bag caddy cart 87.

Odometer 85 comprises a housing 88 rotationally mounted to a mounting base (not shown) that is clamped inside wheel 86. Operation of the odometer, its controls and indicator are the same as those of odometer 10.

FIG. 8 shows an odometer 90 comprising a housing 91 rotationally mounted within a mounting ring 92 by means of a large diameter bearing 93. Housing 91 has its center of gravity well below its center, and beneath a tapered projection 94 that incorporates controls 95 and indicator 96, so that housing 91 remains upright as ring 92 rotates with the wheel of the cart. Clips 97 extending from the periphery of ring 92 are employed to clamp ring 92 inside the rim of the cart wheel. Clips 97 are of the type commonly employed to secure hub caps to the wheels of automobiles.

A second compactly constructed odometer 100 for use in pull-type caddy carts is shown in FIGS. 9 and 10, with odometer 100 comprising a housing 101 rotationally mounted within a mounting ring 102 by means of a bearing 103.

Housing 101 has a circular base 104 that is threaddedly secured to a tapered shell 105 of housing 101. The lower portion of housing 101 carries a weighting element 106 that maintains housing 101 in an upright position as the wheel of the cart rotates.

Mounting ring 102 is shaped like a shallow pan with a thick circumferential wall 107. At three points uniformly distributed about the periphery of ring 102 are three slots 109 with tapered roots 111. The slots 109 extend from the base 112 of ring 102 to within a short distance of its rim 113 leaving a thin web 114.

Three wedge grips 115 are employed to secure ring 102 within the rim of a wheel. Each wedge grip 115 comprises a curved metal back up plate 116 with a tapered projection 117 extending from its concave surface. A tapered rubber pad 118 is cemented or vulcanized to the convex surface of plate 116. The degree of taper of projection 117 corresponds to that of root 111 of one of the slots 109 and the width of projection 117 is slightly smaller than that of slots 109 so that the projections will move freely within the slots. One of the grips 115 is mounted in each of the slots 109 by means of a screw 119 that passes through a clearance hole 121 in web 114, and threads into a longitudinal threaded bore 122 in the end of projection 117. As screw 119 is threaded into bore 122, the tapered projection 117 rides up the tapered slot 109 so that the outer surface of grip 118 moves radially outward as grip 115 is drawn forward toward web 114.

To mount odometer 100 to the wheel of a cart, ring 107 with loosely attached grips 115 is first placed within the rim of the wheel. While the odometer is held in position, the screws 119 are tightened, drawing the grips forward and outward to clamp and rigidly secure the odometer in position.

As in the case of the embodiments described earlier, odometer 100 incorporates a magnetic head 123 that is secured to base 112 at its center of rotation. A Hall effect sensor 124 extends from a circuit board 125 through base 104 of housing 101 past the edge of magnetic head 123. Tapered shell 105 incorporates on an upper inclined surface the readout indicator 126 and on a lower surface, the push-button controls 127.

As a further embellishment of the invention, FIG. 11 illustrates the addition of photo-voltaic solar cells 128 for use in charging the batteries of an odometer 130 and the alternate or further use of an external battery charger 131 that draws power from a utility outlet through a power cord 132 and supplies charging current through a cord 133 that connects by means of a plug 134 to a jack 135 in the side of the odometer housing. Internal wiring connects jack 135 to the batteries of the odometer.

Although but a few embodiments of the invention have been illustrated and described, it will be apparent to those skilled in the art that various changes and modifications may be made therein without departing from the spirit of the invention or from the scope of the appended claims.

What is claimed is:

1. An odometer for mounting on a wheel of power driven and/or hand moved golf carts comprising:
   a frame,
   means for securing said frame to a wheel of a golf cart for rotation therewith around its axis,
   shaft means for attachment to said frame axially of the wheel of the golf cart,
   said shaft means having a magnetic head mounted thereon for rotation therewith and a pendulum supported on said shaft means and independent of its movement,
   a housing mounted on said pendulum,
   said housing containing a sensor positioned adjacent said magnetic head for energization thereof by said magnetic head upon rotation of said frame, and
   counting means mounted within said housing and energized by said sensor for actuation thereof upon rotation of said magnetic head, said counting means comprises an indicator mounted on said housing for illustrating its count, and switch means mounted on said housing for selectively resetting said counting means, whereby the rotation of an associated golf cart wheel results in said counting means measuring the distance traveled by the golf cart.

2. The odometer set forth in claim 1 wherein:
said switch means comprises a push-button control.

3. The odometer set forth in claim 2 wherein:
said push-button control comprises an ON/OFF switch.

4. The odometer set forth in claim 1 wherein:
said means for securing said frame to a wheel of a golf cart engages a rim of the wheel within its outer periphery.

5. The odometer set forth in claim 1 wherein: said pendulum remains relatively stationary with respect to the movement of said magnetic head.

6. The odometer set forth in claim 1 wherein:
said counting means comprises an energizing means mounted within said housing for energization thereof.

7. The odometer set forth in claim 6 wherein:
said energizing means comprises a battery.

8. The odometer set forth in claim 6 wherein:
said energizing means is chargeable by an external battery charger.

9. the odometer set forth in claim 6 wherein:
said energizing means comprises a plurality of photovoltaic solar cells.

10. The odometer set forth in claim 1 wherein:
said sensor comprises a Hall effect sensor.

* * * * *